(12) United States Patent
Lloyd

(10) Patent No.: US 8,067,716 B1
(45) Date of Patent: Nov. 29, 2011

(54) COOKING APPARATUS

(76) Inventor: Ernest L. Lloyd, Gadsden, SC (US)

( * ) Notice: Subject to any disclaimer, the term of this patent is extended or adjusted under 35 U.S.C. 154(b) by 1500 days.

(21) Appl. No.: 11/049,390

(22) Filed: Feb. 3, 2005

(51) Int. Cl.
*A47J 37/12* (2006.01)
(52) U.S. Cl. ............ 219/439; 219/433; 99/331; 99/332; 99/403; 99/415
(58) Field of Classification Search .......... None
See application file for complete search history.

(56) References Cited

U.S. PATENT DOCUMENTS

| | | | |
|---|---|---|---|
| 2,749,427 A * | 6/1956 | Malz | 219/441 |
| 2,753,436 A * | 7/1956 | Schwaneke | 219/441 |
| 2,915,000 A * | 12/1959 | Hetzel | 99/327 |
| 3,618,587 A * | 11/1971 | Lee, Sr. | 126/389.1 |
| 3,722,498 A * | 3/1973 | Kimbrough | 126/38 |
| 4,521,183 A | 6/1985 | Hirai et al. | |
| 5,039,535 A | 8/1991 | Lang et al. | |
| D345,281 S | 3/1994 | Mauffrey | |
| 5,363,746 A | 11/1994 | Gordon | |
| 5,524,527 A | 6/1996 | Dumoux et al. | |
| 5,596,514 A | 1/1997 | Maher, Jr. et al. | |
| 5,628,242 A * | 5/1997 | Higley | 99/332 |
| 5,813,320 A * | 9/1998 | Frasnetti et al. | 99/333 |
| 5,896,810 A * | 4/1999 | Barbour | 99/415 |
| 6,283,014 B1 * | 9/2001 | Ng et al. | 99/330 |
| 6,446,545 B2 * | 9/2002 | Rigney | 99/339 |
| 6,545,252 B2 * | 4/2003 | Wang | 219/432 |
| 6,684,757 B2 * | 2/2004 | Petersen | 99/332 |
| 6,941,857 B2 * | 9/2005 | McLemore | 99/413 |
| 2005/0172949 A1 * | 8/2005 | Moore et al. | 126/39 G |

\* cited by examiner

*Primary Examiner* — Joseph M Pelham

(57) ABSTRACT

A cooking apparatus includes an outer pot that has a bottom wall and a peripheral wall that is attached to and extends upwardly from the bottom wall. A heating assembly is attached to the outer pot and is adapted for selectively heating the outer pot. An actuator is operationally coupled to the heating assembly for selectively turning the heating assembly on or off. The actuator includes a timer for turning off the heating assembly after a selectable amount of time has expired. An inner pot has a lower wall and a perimeter wall that is attached to and extends upwardly from the lower wall. The inner pot has a size adapted for being removably positionable in the outer pot. The perimeter wall has a plurality of apertures extending therethrough.

16 Claims, 5 Drawing Sheets

COOKING APPARATUS

BACKGROUND OF THE INVENTION

1. Field of the Invention

The present invention relates to cooking devices and more particularly pertains to a new cooking device that is adapted for heating food or oil in a pot for selected amount of time and at a selected temperature.

2. Description of the Prior Art

The use of cooking devices is known in the prior art. U.S. Pat. No. 5,813,320 describes a valve device for selectively controlling gas flow to a burner. Another type of cooking device is U.S. Pat. No. 5,596,514 which describes an electronic device adapted for controlling the temperature of a deep fat fryer. U.S. Pat. No. 5,039,535 describes an oven which may be selectively programmed for temperature and time of cooking. This allows a person to place a food item in the oven, program it, and then not worry about burning the food item.

While these devices fulfill their respective, particular objectives and requirements, the need remains for a pot in which food may be cooked or oil heated which is turned off after a selected amount of time has expired. This will ensure that food items placed therein, and in particular in heated oil, will not be accidentally overcooked. Additionally, a thermostat may be included for ensuring a desired temperature of the pot is maintained.

SUMMARY OF THE INVENTION

The present invention meets the needs presented above by comprising an outer pot that has a bottom wall and a peripheral wall that is attached to and extends upwardly from the bottom wall. A heating assembly is attached to the outer pot and is adapted for selectively heating the outer pot. An actuator is operationally coupled to the heating assembly for selectively turning the heating assembly on or off. The actuator includes a timer for turning off the heating assembly after a selectable amount of time has expired. An inner pot has a lower wall and a perimeter wall that is attached to and extends upwardly from the lower wall. The inner pot has a size adapted for being removably positionable in the outer pot. The perimeter wall has a plurality of apertures extending therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
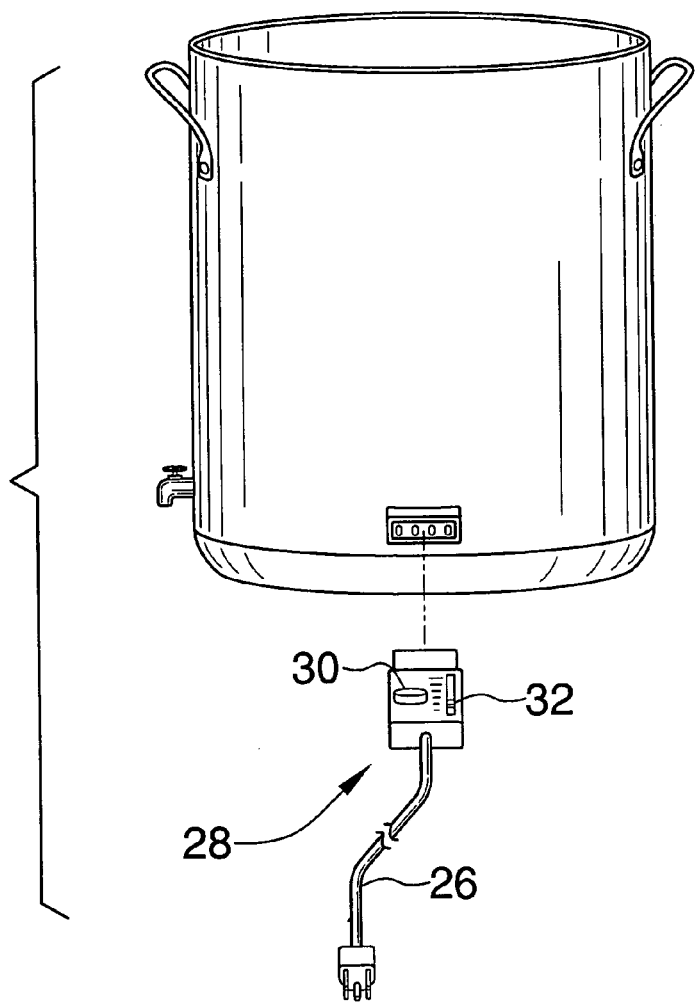
FIG. 1 is a front perspective view of a first embodiment of a cooking apparatus according to the present invention.
Figure 2:
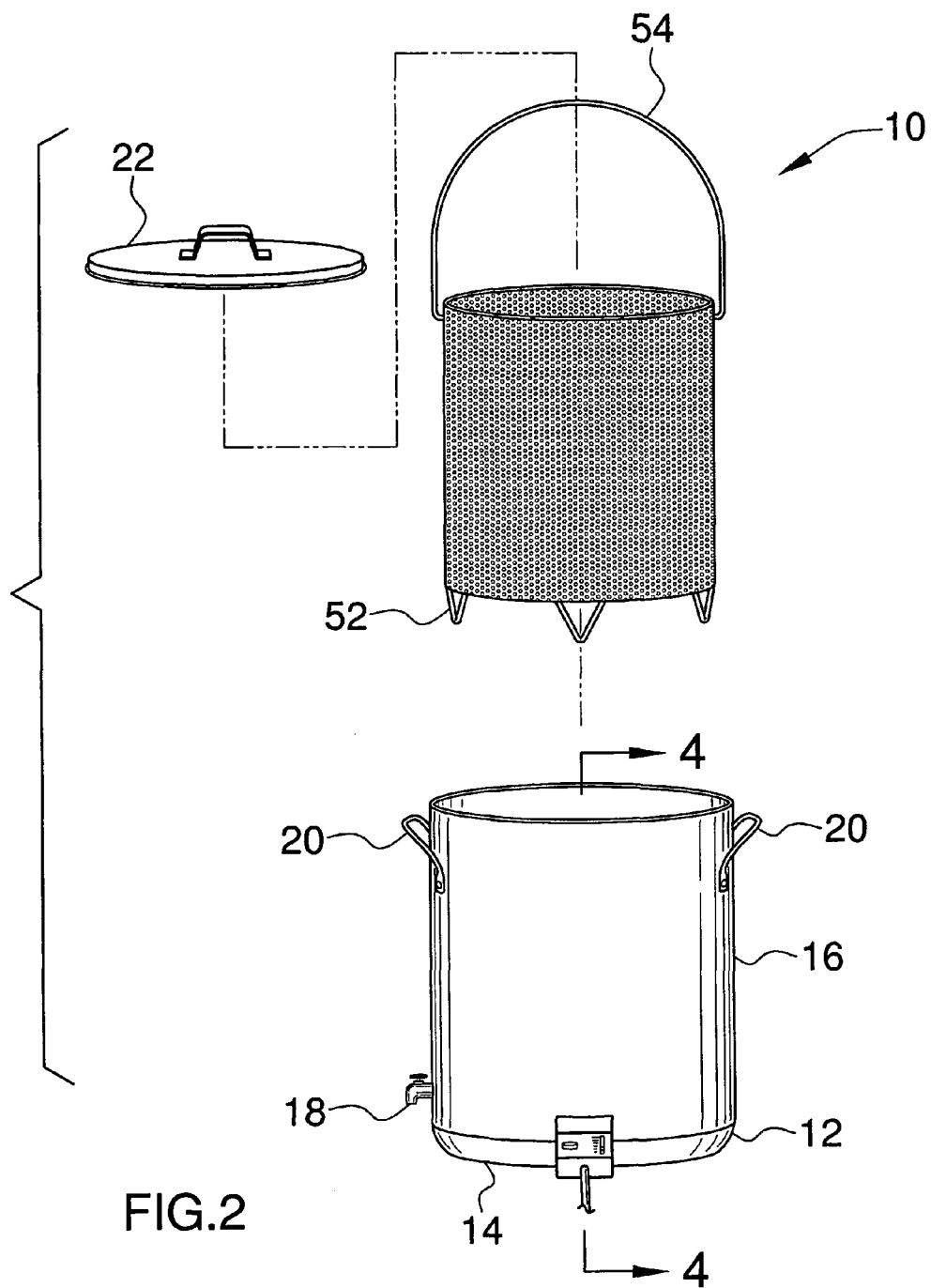
FIG. 2 is a front perspective view of the first embodiment of the present invention.
Figure 3:
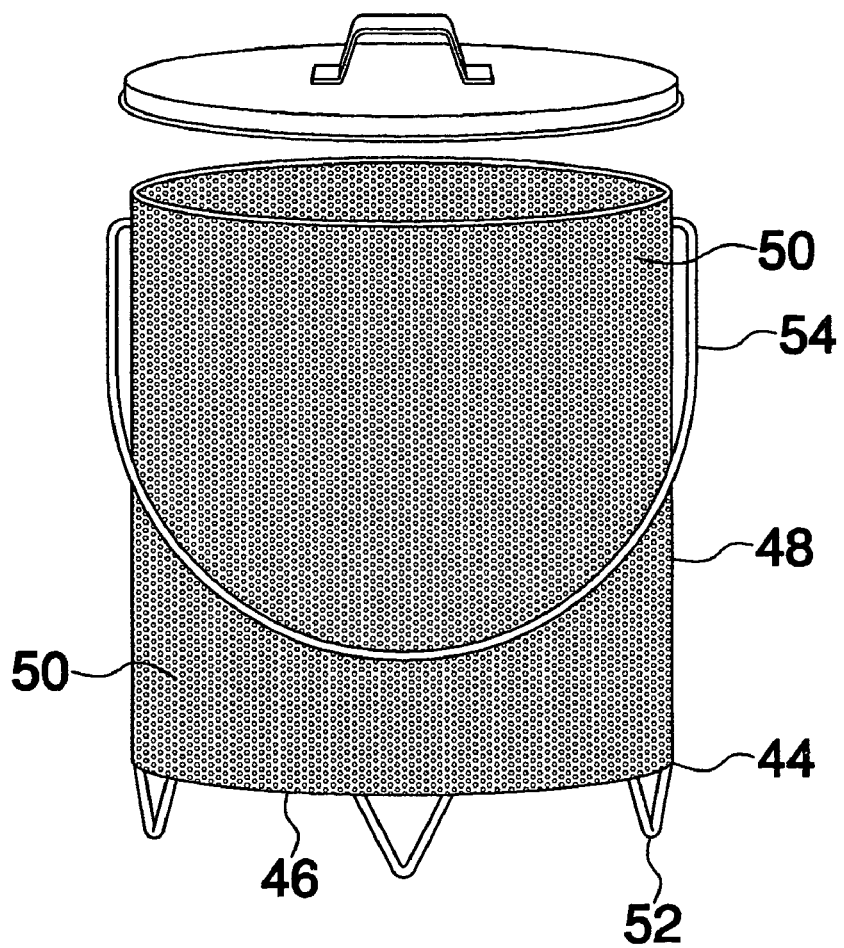
FIG. 3 is a front perspective view of an inner pot of the present invention.
Figure 4:
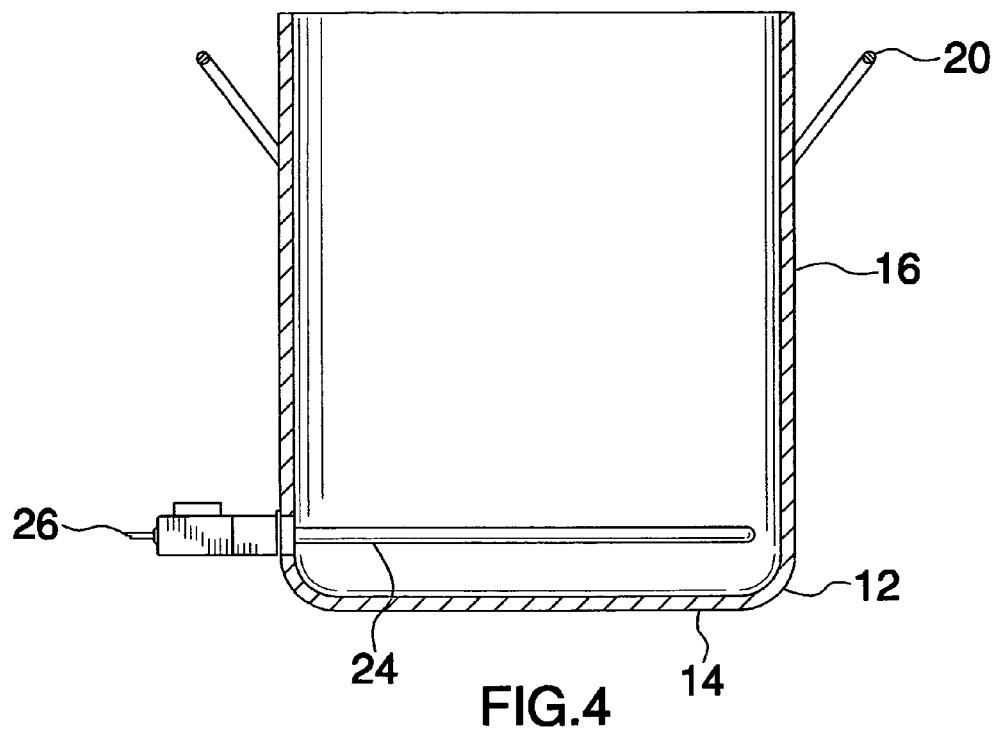
FIG. 4 is a cross-sectional view taken along line 4-4 of FIG. 2 of the present invention.

With reference now to the drawings, and in particular to FIGS. 1 through 6 thereof, a new cooking device embodying the principles and concepts of the present invention and generally designated by the reference numeral 10 will be described.

As best illustrated in FIGS. 1 through 6, the cooking apparatus 10 generally comprises an outer pot 12 that has a bottom wall 14 and a peripheral wall 16 that is attached to and extending upwardly from the bottom wall 14. A drain valve 18 is fluidly coupled to the outer pot 12. A pair of handles 20 may be attached to an outer surface of the outer pot 12. A cover 22 has a size and shape adapted for being removably positioned on the peripheral wall 16 and closing the outer pot 12. A cover 22 has a size and shape adapted for being removably positioned on the peripheral wall 16 and closing the outer pot 12.

A heating assembly is attached to the outer pot and is adapted for selectively heating the outer pot 12. The heating assembly of a first embodiment of the apparatus, shown in FIGS. 1 and 2, includes an electric heating element 24 that is mounted in the outer pot 12 and is positioned adjacent to the bottom wall 14. A power supply is 26 electrically coupled to the electric heating element 24. An actuator 28 is operationally coupled to the heating assembly for selectively turning the heating assembly on or off. The actuator 28 includes a timer 30 that is electrically coupled to the power supply 26 for turning off the power supply 26 after a selectable amount of time has expired. A thermostat 32 extends into the outer pot 12 and is electrically coupled to the power supply 26 for maintaining a selected temperature of an interior of the outer pot.

Figure 5:
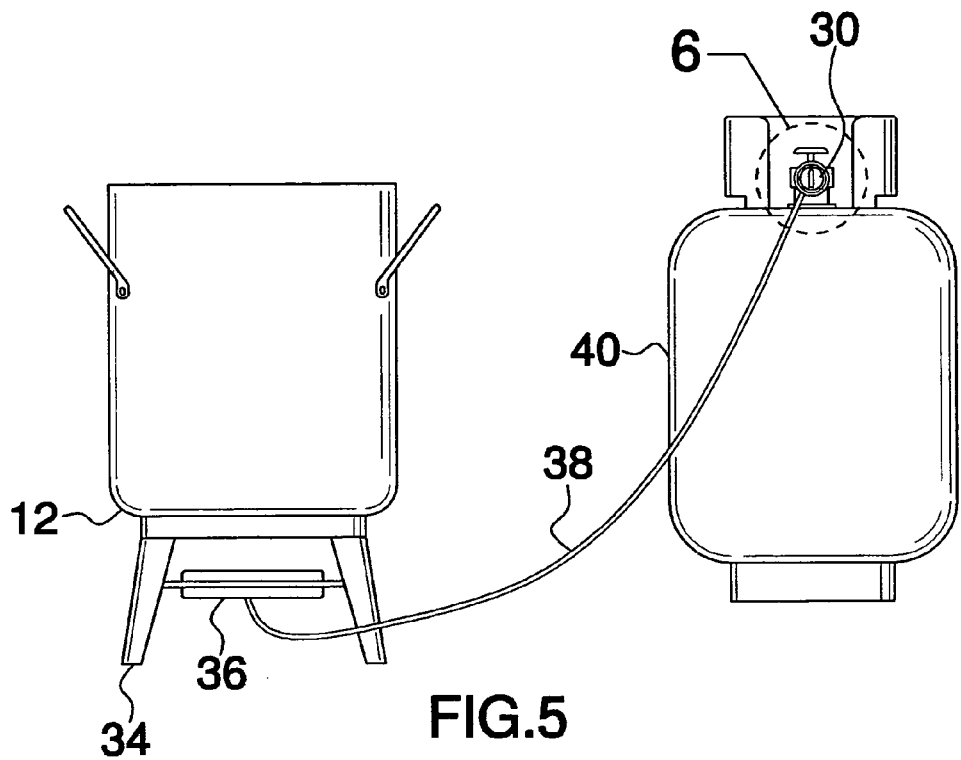
FIG. 5 is a front view of a second embodiment of the present invention.
Figure 6:
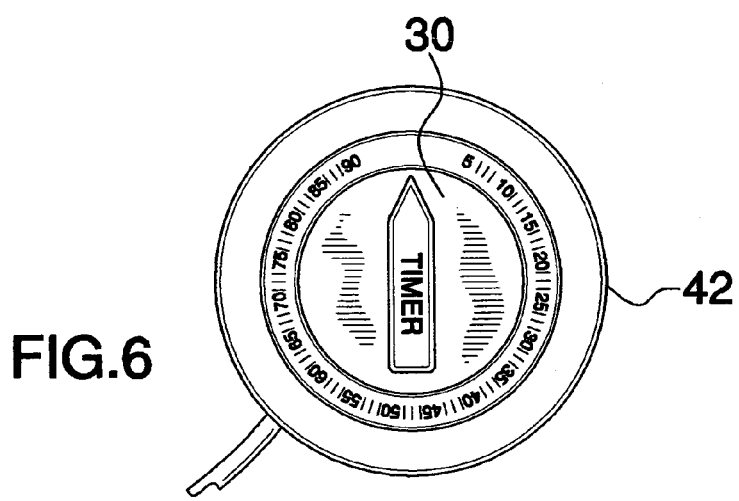
FIG. 6 is an enlarged view of the area designated "6" in FIG. 5 of the present invention.

A second embodiment of the invention is shown in FIGS. 5 and 6 and includes a plurality of legs 34 that are attached to and extend downwardly from the outer pot 12. The second embodiment includes a heating assembly with a gas burner 36 that is attached to the legs 34 and is positioned adjacent to the bottom wall 14. A supply tube 38 fluidly couples a propane tank 40 to the gas burner 36. The timer 30 of the second embodiment includes a valve 42 that is in fluid communication with the tube 38 and is adapted for closing the tube 38 when the selectable amount of time has expired. The propane tank valve or a valve on the burner 36 may maintain the temperature of the burner.

An inner pot 44 has a lower wall 46 and a perimeter wall 48 that is attached to and extends upwardly from the lower wall 46. The inner pot 44 has a size adapted for being removably positionable in the outer pot 12. The perimeter wall 48 has a plurality of apertures 50 extending therethrough. A plurality of supports 52 is attached to and extends downwardly from the lower wall 46. The supports 52 are positioned adjacent to the perimeter wall 48. Each of the supports 52 has a height generally equal to 1½ inches and retains the lower wall 46 in a spaced relationship with the heating element 24 of the first embodiment or with the bottom wall 12 of the second embodiment. A handle 54 is attached to the inner pot 44. The handle 44 is hingedly coupled to the perimeter wall 48 adjacent to an upper edge of the perimeter wall 48.

In use, the outer pot 12 may be filled with oil which may be heated with the heating assembly. Once the oil has reached its intended temperature, the food to be cooked may be placed in the inner pot 44 and the inner pot 44 then placed in the outer pot 12 so that the oil may cook the food. The user of the apparatus need not be concerned with over cooking the food as the timer will turn off the heating assembly when a preselected amount of time has elapsed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking apparatus comprising:
   an outer pot having a bottom wall and a peripheral wall being attached to and extending upwardly from said bottom wall, said bottom wall having an upper surface being substantially planar and horizontally oriented;
   a heating assembly being attached to said outer pot and being adapted for selectively heating said outer pot;
   an actuator being operationally coupled to said heating assembly for selectively turning said heating assembly on or off, said actuator including;
      a timer being adapted for turning off said heating assembly after a selectable amount of time has expired;
   an inner pot having a lower wall and a perimeter wall being attached to and extending upwardly from said lower wall, said inner pot having a size adapted for being removably positionable in said outer pot, said perimeter wall having a plurality of apertures extending therethrough; and
   a drain valve being fluidly coupled to said outer pot.

2. The apparatus according to claim 1, wherein said heating assembly includes an electric heating element mounted in said outer pot and being positioned adjacent to said bottom wall, a power supply being electrically coupled to said electric heating element, said timer being electrically coupled to said power supply.

3. The apparatus according to claim 2, wherein said actuator further including a thermostat extending into said outer pot, said thermostat being electrically coupled to said power supply for maintaining a selected temperature of an interior of said outer pot.

4. The apparatus according to claim 2, further including a plurality of supports being attached to and extending downwardly from said lower wall of said inner pot, said supports being positioned adjacent to said perimeter wall, each of said supports having a height generally equal to 1½ inches.

5. The apparatus according to claim 4, further including a handle being attached to said inner pot, said handle being hingedly coupled to said perimeter wall adjacent to an upper edge of said perimeter wall.

6. The apparatus according to claim 3, further including a cover having a size and shape adapted for being removably positioned on said peripheral wall and closing said outer pot.

7. The apparatus according to claim 1, further including a plurality of legs being attached to and extending downwardly from said outer pot.

8. The apparatus according to claim 7, wherein said heating assembly includes a gas burner being attached to said legs and being positioned adjacent to said bottom wall, a supply tube fluidly coupling a propane tank to said gas burner, said timer including a valve being in fluid communication with said tube and being adapted for closing said tube when said selectable amount of time has expired.

9. The apparatus according to claim 8, further including a plurality of supports being attached to and extending downwardly from said lower wall of said inner pot, said supports being positioned adjacent to said perimeter wall, each of said supports having a height generally equal to 1½ inches.

10. The apparatus according to claim 9, further including a handle being attached to said inner pot, said handle being hingedly coupled to said perimeter wall adjacent to an upper edge of said perimeter wall.

11. The apparatus according to claim 10, further including a cover having a size and shape adapted for being removably positioned on said peripheral wall and closing said outer pot.

12. A cooking apparatus comprising:
   an outer pot having a bottom wall and a peripheral wall being attached to and extending upwardly from said bottom wall, said bottom wall having an upper surface being substantially planar, a drain valve being fluidly coupled to said outer pot;
   a heating assembly being attached to said outer pot and being adapted for selectively heating said outer pot, said heating assembly including an electric heating element mounted in said outer pot and being positioned adjacent to said bottom wall, a power supply being electrically coupled to said electric heating element;
   an actuator being operationally coupled to said heating assembly for selectively turning said heating assembly on or off, said actuator including;
      a timer being electrically coupled to said power supply for turning off said power supply after a selectable amount of time has expired;
      a thermostat extending into said outer pot, said thermostat being electrically coupled to said power supply for maintaining a selected temperature of an interior of said outer pot;
   an inner pot having a lower wall and a perimeter wall being attached to and extending upwardly from said lower wall, said inner pot having a size adapted for being removably positionable in said outer pot, said perimeter wall having a plurality of apertures extending therethrough, a plurality of supports being attached to and extending downwardly from said lower wall, said supports being positioned adjacent to said perimeter wall, each of said supports having a height generally equal to 1½ inches, a handle being attached to said inner pot, said handle being hingedly coupled to said perimeter wall adjacent to an upper edge of said perimeter wall;
   a cover having a size and shape adapted for being removably positioned on said peripheral wall and closing said outer pot.

13. A cooking apparatus comprising:
   an outer pot having a bottom wall and a peripheral wall being attached to and extending upwardly from said bottom wall, said bottom wall having an upper surface being substantially planar;

a plurality of legs being attached to and extending downwardly from said outer pot;

a heating assembly being attached to said outer pot and being adapted for selectively heating said outer pot, said heating assembly including a gas burner being attached to said legs and being positioned adjacent to said bottom wall, a supply tube fluidly coupling a propane tank to said gas burner an actuator being operationally coupled to said heating assembly for selectively turning said heating assembly on or off, said actuator including a timer being configure to turn off said heating assembly after a selectable amount of time has expired, said timer including a valve being in fluid communication with said tube and being configured to close said tube when said selectable amount of time has expired; and an inner pot having a lower wall and a perimeter wall being attached to and extending upwardly from said lower wall, said inner pot having a size adapted for being removably positionable in said outer pot, said perimeter wall having a plurality of apertures extending therethrough.

14. The apparatus according to claim 13, further including a plurality of supports being attached to and extending downwardly from said lower wall of said inner pot, said supports being positioned adjacent to said perimeter wall, each of said supports having a height generally equal to 1½ inches.

15. The apparatus according to claim 13, further including a handle being attached to said inner pot, said handle being hingedly coupled to said perimeter wall adjacent to an upper edge of said perimeter wall.

16. The apparatus according to claim 13, further including a cover having a size and shape adapted for being removably positioned on said peripheral wall and closing said outer pot.

* * * * *